Figure 1:
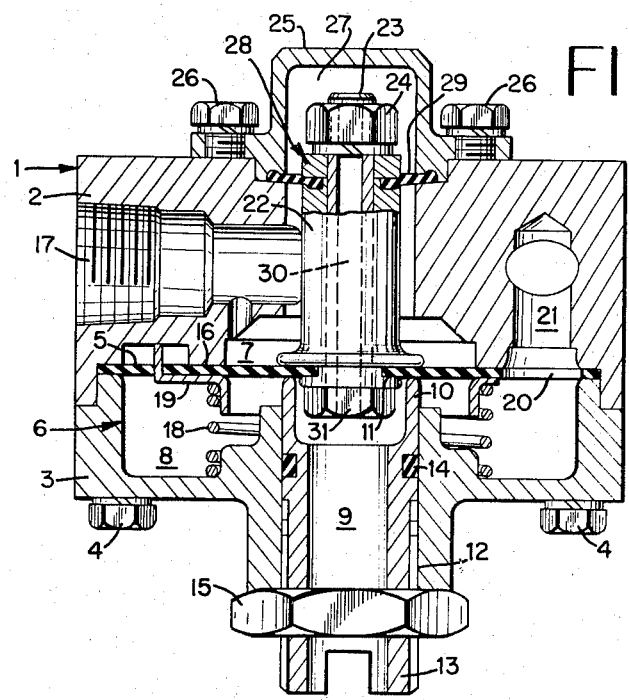

United States Patent

[11] 3,630,577

| [72] | Inventor | John Walter Davis<br>5 Hathaway Close, Balsall Common, Coventry CV7, 7EP, Warwickshire, England |
|---|---|---|
| [21] | Appl. No. | 92,823 |
| [22] | Filed | Nov. 25, 1970 |
| [45] | Patented | Dec. 28, 1971 |
| | | Original application Sept. 23, 1968, Ser. No. 761,681, now abandoned. Divided and this application Nov. 25, 1970, Ser. No. 92,823 |

[54] VEHICLE ANTISKID BRAKING SYSTEMS
7 Claims, 3 Drawing Figs.

[52] U.S. Cl. ............................................. 303/21 F, 137/102, 303/40
[51] Int. Cl. ............................................. B60t 8/00, B60t 15/00
[50] Field of Search ............................................. 137/102; 303/21, 68, 69, 61–63, 40, 6

[56] References Cited

UNITED STATES PATENTS

| 2,893,381 | 7/1959 | Black ........................... | 137/102 |
| 3,070,108 | 12/1962 | Fischer ........................ | 137/102 |
| 3,188,148 | 6/1965 | Eaton ........................... | 303/21 |

FOREIGN PATENTS

| 518,431 | 2/1940 | Great Britain ............... | 137/102 |

Primary Examiner—Milton Buchler
Assistant Examiner—John J. McLaughlin
Attorney—John A. Young ABSTRACT: A valve having an annular inlet valve seat and an annular exhaust valve seat arranged concentrically and a flap valve diaphragm which is engageable at its outer peripheral portion with the inlet seat and at its central portion with the exhaust seat and which can flex to uncover either the inlet seat or the exhaust seat, a stem being secured to the flap valve diaphragm and to a second diaphragm and being arranged to balance the pressures acting on the flap valve diaphragm.

PATENTED DEC 28 1971  3,630,577

*INVENTOR.*
JOHN WALTER DAVIS

VEHICLE ANTISKID BRAKING SYSTEMS

This application is a Division Application of U.S. application Ser. No. 761,681, filed Sept. 23, 1968, now U.S. Pat. No. 3,575,473 and entitled "VEHICLE ANTI-SKID BRAKING SYSTEMS."

This invention relates to fluid flow control valves of the kind which permits flow between either of two connections to the valve and a third connection, particularly for use in antiskid devices for pneumatically operated brake systems.

A known valve of this kind has an inlet chamber and an outlet chamber separated by a flap valve diaphragm and an exhaust passage communicating with a valve seat located within the outlet chamber and engageable with the central portion of the flap valve diaphragm to seal the exhaust passage. When pressure in the inlet chamber exceeds that in the outlet chamber the flap valve yields to allow communication between the two chambers and at the same time to seal the exhaust passage. When the pressure in the outlet chamber exceeds that in the inlet chamber the flap valve closes and if the pressure difference is sufficiently great the central portion of the flap valve yields to uncover the exhaust passage. With this kind of valve the pressure in the inlet chamber keeping the central portion of the flap valve in sealing engagement with the exhaust valve seat acts over a larger area than does the pressure in the outlet chamber tending to open the exhaust.

The object of the present invention is to provide an improved fluid flow control valve.

An object of the present application is to provide a valve having a stem of tubular form and two annular diaphragms, the one being secured at its inner periphery to the valve body, and at its outer periphery to the stem, and the other valve diaphragm being secured at its inner periphery to the stem so that the area on which pressure in an inlet chamber acts to move the valve member into sealing engagement with an exhaust valve seat is equal to the area on which the pressure in the outlet chamber acts to move the one valve member out of engagement with the exhaust valve seat.

Figure 2:
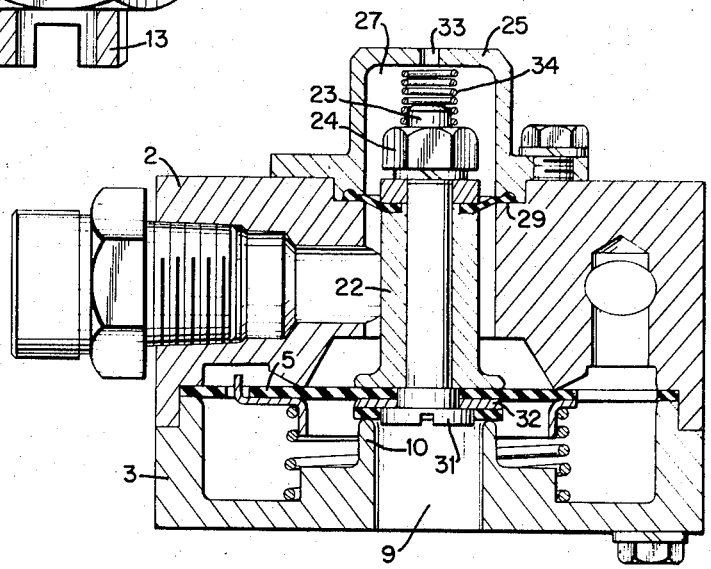
Figure 3:
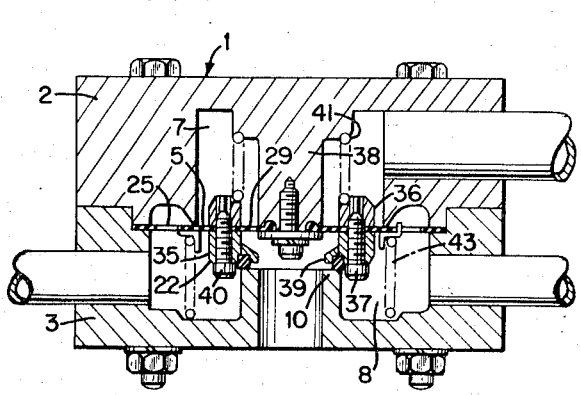

Several embodiments of the invention will now be described by way of example with reference to the accompanying drawings in which:

FIG. 1 is an axial cross-sectional view of a valve according to the invention; and FIGS. 2 and 3 are axial cross-sectional views of alternative valves according to the invention.

FIG. 1 shows a valve which comprises a valve body 1 formed from two parts 2, 3, secured together by bolts 4, and the outer periphery of a flap valve diaphragm 5 is trapped between the two parts 2, 3 to give an elastomeric seal.

The interior of the body 1 forms a main chamber 6 which is divided into an inlet chamber 7 and an outlet chamber 8 by the flap valve diaphragm 5, and on one side of the diaphragm 5, an axial exhaust passage 9 opens to the chamber 6 and terminates in a seat 10. The central portion 11 of the diaphragm 5 acts as a valve member for sealing engagement with the seat 10.

The exhaust passage 9 is formed within a screw-threaded bore in the body part 3, the bore 12 housing a threaded sleeve 13 so as to enable the position of the seat 10 formed by the inner end of the sleeve to be adjusted. An O-ring seal 14 about the sleeve 13 and a locknut 15 to hold it in position are also provided.

On the opposite side of the diaphragm to the exhaust passage 9 and seat 10, an inlet seat consisting of an axially projecting annular flange 16 is formed in the part 2 of the body 1 and defines the inlet chamber 7. A radially extending inlet passage 17 communicating with the inlet chamber 7 is formed in the body part 2. The seat 16 is coaxial with the exhaust passage 9 and of larger diameter so that inlet supply pressure acts on an area of the diaphragm 5 to flex the diaphragm, so as to increase the seal on the seat 10 while permitting movement of the diaphragm 5 away from the inlet seat 16 to allow communication between the inlet chamber 7 and the outlet chamber 8.

A spring 18 extends between the diaphragm 5 and the opposite face of the outlet chamber 8 and seats on a cup 19 contacting the diaphragm 5 on the side opposite to the inlet seat 16.

The spring 18 urges the flap valve diaphragm 5 into sealing engagement with the inlet valve seat 16, and the amount by which the pressure in the inlet chamber 7 must exceed the pressure in the outlet chamber 8 to move the diaphragm 5 out of engagement with the inlet seat 16 is dependent upon the strength of the spring.

Apertures 20 are provided in the outer peripheral portion of the flap valve diaphragm 5 to allow communication between the inlet chamber 7 and the outlet chamber 8 when the flap valve diaphragm 5 is moved out of engagement with the valve seat 16. The apertures also serve to reduce the stiffness of the diaphragm 5.

An outlet passage 21 is formed in the body part 2 and communicates with the outlet chamber 8 through the apertures 20.

The central portion 11 of the flap valve diaphragm 5 which acts as a valve member for sealing engagement with the seat 10 is secured to one end of a stem, which consists of a sleeve 22, by means of a bolt 23 passing through the sleeve and locking nut 24. The stem 22 extends axially with respect to the valve body 1 within the inlet chamber 7. The inlet chamber 7 is sealed by a cap 25 which is secured to the body part 2 by means of bolts 26. The cap defines a subsidiary chamber 27 which houses the other end 28 of the stem 22. A second annular diaphragm 29 is secured at its inner periphery to the stem 22 and its outer periphery is trapped between the cap 25 and the body part 2.

The second diaphragm 29 separates the subsidiary chamber 27 from the inlet chamber 7 and the diaphragm 29 is exposed to the pressure within the subsidiary chamber 27 on one side and to the pressure within the inlet chamber 7 on its other side.

The bolt 23 is provided with an axial bore 30 so that the pressure in the subsidiary chamber 27 is maintained the same as the pressure in the exhaust passage 9.

The stem 22 is supported by the flap valve diaphragm 5 and the second diaphragm 29 and is freely spaced from the body part 2.

The area contained by the line of contact of the second diaphragm 29 with the valve body 1 is equal to the area of the central portion 11 of the flap valve diaphragm 5 defined by the valve seat 10. With this arrangement the thrust exerted on the second diaphragm 29 due to the pressure in the inlet chamber 7 is equal to the thrust exerted on the central portion 11 of the flap valve diaphragm 5 due to the pressure in the inlet chamber 7. Since the two diaphragms are joined together by the valve stem 22 these thrusts cancel out and effectively the area of the flap valve diaphragm 5 on which the pressure in the inlet chamber acts to hold the diaphragm 5 in sealing engagement with the valve seat 10 is equal to the area of the diaphragm 5 on which the pressure in the outlet chamber acts to lift the diaphragm 5 off the valve seat 10. Thus the diaphragm 5 is balanced and only a small pressure difference is required to lift the diaphragm off the exhaust seat 10.

In the embodiment shown in FIG. 2 the stem 22 is secured to the diaphragm 5 by means of a bolt 23 having a washer 32 arranged between the head 31 of the bolt 23 and the diaphragm 5, the washer 32 acting as a valve member engageable with the exhaust seat 10 to seal the exhaust passage 9. The exhaust passage 9 is open to the atmosphere and the cap 25 has a hole 33 formed therein so that the subsidiary chamber 27 is open to the atmosphere. A spring 34 is also provided between the locking nut 24 and the cap 25 to urge the valve member 32 into sealing engagement with the exhaust seat 10.

In the embodiment shown in FIG. 3 the flap valve diaphragm 5 and the second diaphragm 29 are each annular in form and are formed integrally. The valve stem 22 is formed from two rings 35,36 secured together by bolts 37 trapping the inner periphery of the flap valve diaphragm 25 and the outer periphery of the second diaphragm 29 therebetween. The inner periphery of the second diaphragm is secured to an axially extending portion 38 of the valve body.

The stem 22 has a radially inwardly extending circumferential flange 39 formed thereon to which is secured a sealing member in he form of rubber ring 40 which constitutes the valve member for sealing engagement with the exhaust valve seat 10.

A spring 41 is arranged between the stem and the valve body to urge the valve member 40 into sealing engagement with the exhaust valve seat 10 and the second spring 43 is arranged to act between the flap valve diaphragm and the valve housing to urge the flap valve diaphragm into engagement with the inlet valve seat.

The pressure in the inlet chamber 7 acts on both diaphragms. The area of the flap valve diaphragm 5 on which the pressure in the inlet chamber 7 acts to hold the valve member 40 in sealing engagement with the exhaust seat 10 is equal to the area of the diaphragm 5 on which the pressure in the outlet chamber 8 acts to lift the valve member 40 off the exhaust seat 10. The pressure acting on the second diaphragm 29 is balanced by the pressure acting on the radially inwardly extending flange 39.

The valves described above may be used in a pneumatic braking system of the kind described in the specification of our U.S. Pat. No. 3,411,835, in which brake-applying pressure is applied to a chamber housing a diaphragm so as to displace a rod connected to the diaphragm for brake application. Skid avoidance is achieved by applying counterpressure to the diaphragm and this involves increase of pressure in the chamber which is vented to exhaust by a two-way valve interposed in the supply line. The valves described above may take the place of the two-way valve. When the brakes are applied, pressure in the inlet chamber 7 displaces the flap diaphragm 5 against the spring 18 to allow flow over the inlet seat 16 to the outlet chamber 8, and when pressure in the outlet chamber 8 exceeds that in the inlet chamber 7 due to application of brake-releasing pressure, the diaphragm 5 flexes to prevent flow from the inlet chamber to the outlet chamber and to open the exhaust.

The valves described above have balanced flap valve diaphragms and consequently high sensitivity. That is, only a small excess of pressure is required in the outlet chamber to cause the diaphragm to yield and open the exhaust.

In addition the stem is wholly supported by the two diaphragms so that there is small frictional resistance to movement and movement is not impeded by unavoidable dirt or moisture often present in pneumatic systems.

What I claim is:

1. A valve comprising a valve body having inlet and outlet chambers formed therein, an annular flexible flap valve diaphragm forming a separating wall between said inlet and outlet chambers, said flap valve diaphragm being secured at its outer periphery to said valve body, an annular stem adapted to receive the inner periphery of said flap valve diaphragm and having a valve member adapted to sealingly engage an exhaust valve seat disposed in said outlet chamber and operatively communicating with an exhaust passage, a second annular flap valve diaphragm secured at its outer periphery to said annular stem and at its inner periphery to said valve body, means forming an inlet valve seat sealingly engageable by said first flap valve diaphragm to control thereby communication between said inlet and said outlet chambers, said first and second flap valve diaphragms being flexible to be moved between first and second positions to effect opening of said inlet valve seat or said exhaust valve seat, said stem being constructed and arranged to effect a substantial balancing of pressures acting on both said first flap valve diaphragm and said second flap valve diaphragm when said valve member is in sealing position with the exhaust valve seat.

2. A valve according to claim 1 wherein the area of said flap valve diaphragm on which pressure from the inlet chamber acts to move said valve member into engagement with the exhaust valve seat is substantially equal to the area of the flap valve diaphragm on which pressure in he outlet chamber acts to move the valve member out of engagement with said exhaust valve seat.

3. A valve according to claim 2 wherein the two diaphragms are arranged concentrically.

4. A valve according to claim 3 wherein the two diaphragms are formed integrally.

5. A valve according to claim 2 wherein the valve member comprises a ring secured to the stem.

6. A valve according to claim 5 wherein the valve member is secured to a radially inwardly projecting flange formed on the stem.

7. The valve according to claim 1 including a first spring arranged to act between said stem and said valve body to urge the valve member into engagement with said exhaust valve seat, and a second spring arranged to act between said first flap valve diaphragm and said valve housing to urge said first flap valve diaphragm into sealing engagement with said inlet valve seat.

* * * * *